United States Patent [19]

Weil

[11] Patent Number: 4,910,593
[45] Date of Patent: Mar. 20, 1990

[54] SYSTEM FOR GEOLOGICAL DEFECT DETECTION UTILIZING COMPOSITE VIDEO-INFRARED THERMOGRAPHY

[75] Inventor: Gary J. Weil, St. Louis, Mo.

[73] Assignee: EnTech Engineering, Inc., St. Louis, Mo.

[21] Appl. No.: 339,070

[22] Filed: Apr. 14, 1989

[51] Int. Cl.$^4$ ............................................... H04N 7/18
[52] U.S. Cl. ..................................... 358/113; 356/369; 358/93; 360/5; 360/14.1
[58] Field of Search ................. 358/93, 103, 106, 107, 358/113; 73/154; 382/1; 360/5, 14.1; 356/369

[56] References Cited

U.S. PATENT DOCUMENTS

| | | | |
|---|---|---|---|
| 3,761,713 | 9/1973 | Merrill | 73/154 |
| 4,560,279 | 12/1985 | Kouns | 356/369 |
| 4,578,584 | 3/1986 | Baumann et al. | 250/341 |
| 4,700,223 | 10/1987 | Shoutaro | 358/93 |
| 4,710,628 | 12/1987 | Jordan | 250/341 |
| 4,852,182 | 7/1989 | Herbin | 73/153 |

OTHER PUBLICATIONS

Weil, Gary J., *Thermal Infrared Sensing for Diagnostics and Control*, Apr., 1988, V. 934 Proceedings of SPIE-The International Society for Optical Engineering, pp. 155-163, Apr., 1988.

Sverdrup, *EnTech Engineering, Revolutionary Method Pinpoints Sewer Problems, Preventing Possible Collapses*, 1986.

Primary Examiner—Howard W. Britton
Attorney, Agent, or Firm—Kalish & Gilster

[57] ABSTRACT

A selectively mobile system with an infrared scanner and video camera having a common area of focus and apparatus for detecting location permits detection of subterranean geological anomalies. Infrared and visual images are simultaneously successively recorded on videotape together with related location data and other relevant information. Video recorded infrared, video and location data are selectively captured on successive frames. Such frames are recorded for further analysis.

49 Claims, 4 Drawing Sheets

SYSTEM FOR GEOLOGICAL DEFECT DETECTION UTILIZING COMPOSITE VIDEO-INFRARED THERMOGRAPHY

BACKGROUND OF THE INVENTION

This invention relates to the field of geological defect detection methods and devices, and more particularly to a novel and advantageous infrared thermographic sensing system and methodology using video cameras and infrared scanners to create both video and infrared images which are analyzed simultaneously with location information for detection of subterranean anomalies in geological areas.

Geological areas often contain subterranean anomalies such as erosion cavities, small caves, or voids (large open spaces, for example, above old sewers), abandoned or leaking utility pipes, pulverized or deteriorating ("punky") concrete, buried storage tanks or other large objects. If ignored, these anomalies may deteriorate and the ground surrounding them may crumble until the surface eventually collapses. At the very least, such cave-ins result in economic loss which could be avoided by early detection of the problem and subsequent remedial measures. If the defect results in a very large cave-in (sink-hole) or perhaps an extensive natural gas leak, there could also be loss of life. Prevention of these disasters invariably is less expensive than remedial measures.

Historically, utility companies and highway departments have attempted to locate problem sites by a variety of methods. Other than waiting for a cave-in to occur or for a leak to come to the surface, the following methods have also been used: physical inspection of surface areas for cracks, bulges, or depressions; sending personnel literally to crawl through sewers and take photographs of suspicious areas; "sounding" along the surface to detect differences in tone indicative of possible problem sites; boring out samples to detect variations in the subsoil; scanning the surface with metal detectors, penetrating tee ground with a probe to transmit and receive radar or infrared signals and thus detect variations in stratigraphic trends, or electrical contrasts; and testing with a falling weight deflectometer to detect variations in pavement surfaces. Miscellaneous inadequacies exist with each of the above defect detection methods.

Crawl-through teams face the risks of poisonous gasses, scalding, flooding or collapse of the sewer around them, yet from inside a sewer they are unable to detect many voids which may exist in the surrounding earth. Other invasive methods such as taking core samples or penetrating the surface with a radar probe are time-consuming and inaccurate and may increase the risk of a cave-in. Metal detectors may detect buried drums or tanks but of course cannot reveal the presence of voids or other non-metallic objects, such as abandoned gravesites or plastic pipes or drums. The ground-probing radar method may suffer from electronic interference, for example due to water lines, and requires a trained geophysicist to interpret the results. Leaking gas or water lines which have not yet washed away the surrounding soil will very likely be missed by conventional defect detection methods. All of the above methods are inefficient in terms of time and personnel required, as well as being inaccurate to varying degrees.

More recently, various methods of infrared thermography have been used to detect subsurface geological anomalies. In one method, referred to herein as the "hand-held" method, still images have been taken of the same general area using both an infrared scanner and a hand-held camera. The resultant infrared image, or thermogram, is analyzed for variations in relative temperature over the test area. The visual snapshot is later compared to the thermogram to attempt to locate a defect within the study area. For example, the image of a man seen standing in the snapshot will be noted on the thermogram by a different temperature "signature," or color. Likewise, as later explained, a geological anomaly will present its own unique thermographic signature.

The hand-held method of defect detection presents several problems. The infrared and visual images must be taken from a point well above the suspect geological surface area; this requires that two sets of personnel must be on hand, one to operate the equipment from, for example, a tower, roof-top or cherry-picker and another to work on the ground, marking comparison positions, etc. The two crews must communicate by hand-signals, walkie-talkies, or the like. This hand-held imaging method is time-consuming and inefficient because only a limited area can be imaged from a given position. Then the crews must pack up their equipment and reposition at another site for a different angle of the same area or to view another test area. These limitations made the method inadequate for evaluating very large geological areas, for example, long stretches of highway, sewer routes or airport runways.

A variation on the hand-held method is known, in which the infrared unit actually scans a test area as the unit is moved over the area by being mounted on a tripod on a truck or helicopter, for example. That method also requires comparison of thermograms with still photographs taken at various sites within the test area. In this method location markers may be manually applied to the test area, such as by setting flares to act as thermographic and visual markers or by painting footage markers along the entire section of pavement to be scanned, perhaps for miles.

In both of the above thermographic methods a great deal of time and manpower is required to perform even one test. Furthermore, because the thermogram and snapshots are not in goo registration with each other, much time is spent in comparative analysis of the infrared and visual images to detect the precise anomalie location within the viewed area. A location error of even ten or twenty feet can result in maintenance crews wasting inordinate amounts of time and money while attempting to locate the problem.

SUMMARY OF THE INVENTION

Among the several objects of the present invention may be noted the provision of a relatively fast, economical, safe, efficient, accurate, and reliable system and method for detection of subterranean anomalies, including voids; which system is highly automated and has integrated components, and which system and methods are non-invasive, non-destructive and can be used on very large areas, in daytime or nighttime, under a variety of weather and surface conditions. Among other objects of the invention are to provide such system and methods which are reasonably unobtrusive to the surrounding environment and cause minimal inconvenience to people in or passing through the area.

Briefly, this method being carried out by a system for infrared and video scanning and comparative analysis for evaluating geological areas for subterranean anomalies which system comprises the combination of an infrared scanner, a video camera, mobile carrying means upon which said infrared scanner and said video camera are optionally fixable, location detection means, and image and location data processing and preservation means. The infrared scanner and video camera are alignable to provide overlapping fields of view having a common area of focus. The location indicator means comprises means for providing location data uniquely representative of locations within the common area of focus. The image and location data processing and preservation means comprises means for continuously capturing infrare and video images and location data within the common area of focus, for superposing the infrared image, video image and location data on a single video frame, for successively video recording the video data frames for further use, and for simultaneously selectively monitoring the infrared and video images and location data for visual verification of the video data frames.

Other objects and features will be in part apparent and in part pointed out hereinbelow.

DESCRIPTION OF THE PREFERRED EMBODIMENT

Figure 1:
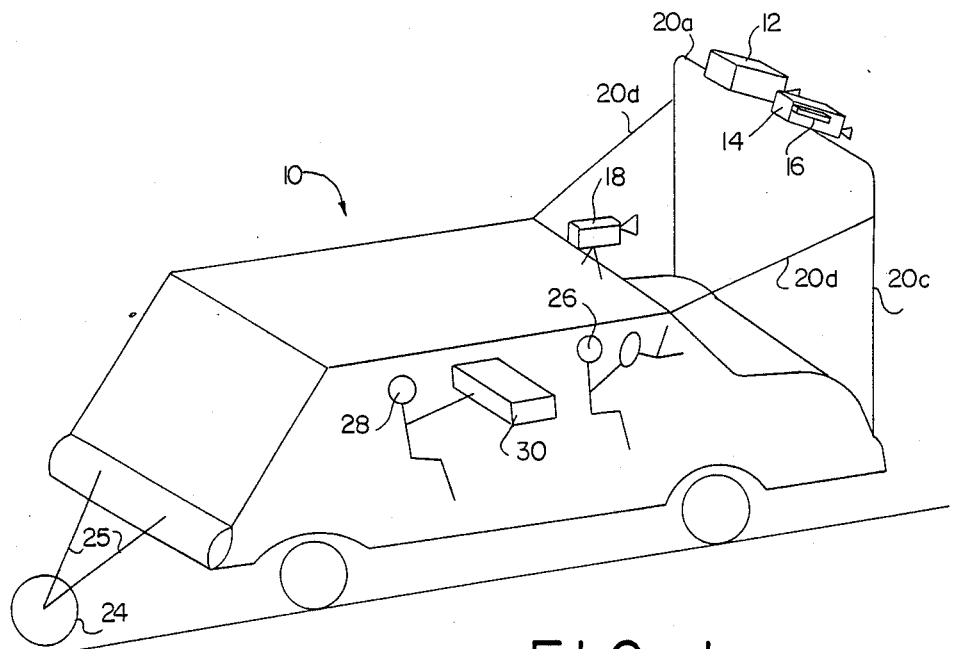
FIG. 1 is a schematic illustration of a van, showing a video camera and infrared scanner affixed to a front mounted boom in a system embodying the present invention, the system being shown as including an additional camera mounted for a driver's eye view and means for location detection.

Referring to the drawings, illustrated schematically (FIG. 1) and generally at 10 is a selectively mobile infrared thermography system. The system 10 includes an infrare ("IR") scanner 12 and a video camera 14 carried by a support boom 20 which is attached to a vehicle 22. The system 10 includes a fifth wheel 24, as illustrative of one possible type of location input means. The vehicle 22 carries within it location data processing and preservation means (generally designated 30) of the system 10.

Figure 2:
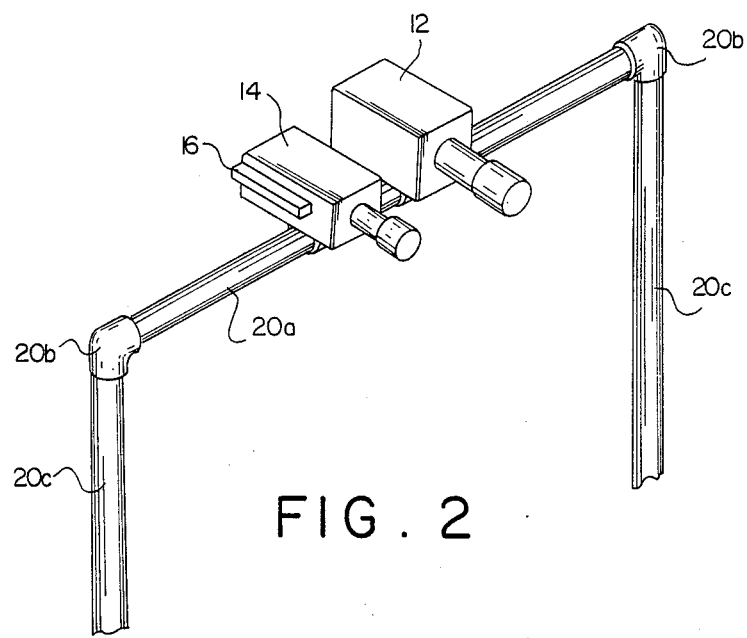
FIG. 2 is a schematic illustration showing a close-up of an infrared scanner and conventional video camera colocated for carrying on a van or other mobile means.
Figure 6:
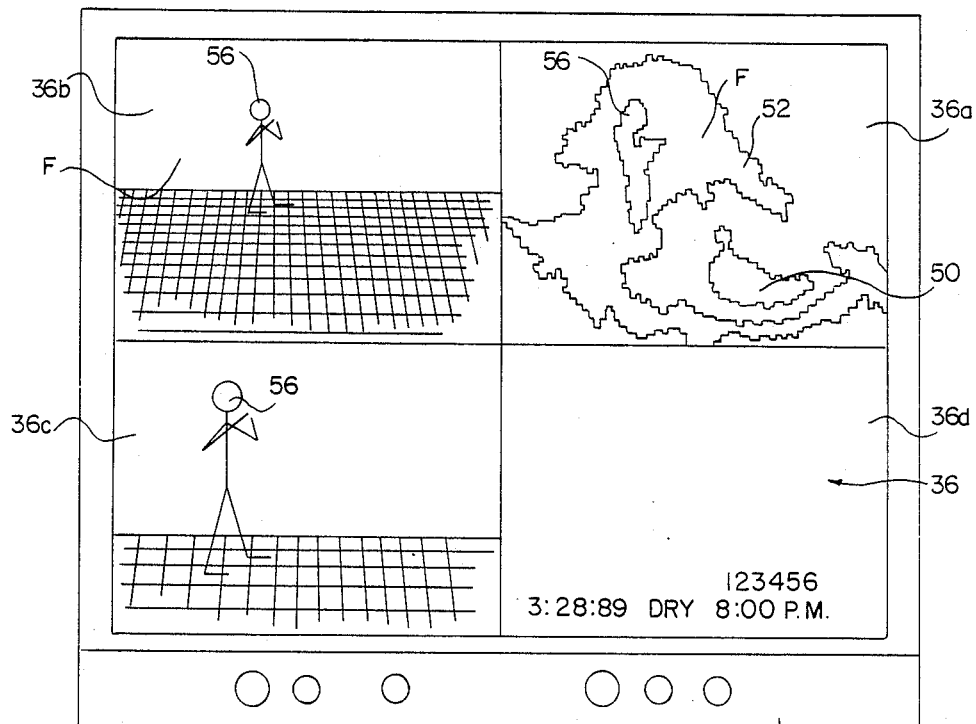
FIG. 6 is a simplified pictorial representation of the composite color monitor of the present invention.

A horizontal cross bar 20a fixed by elbow joints 20b at the top of two vertical members 20c of the boom 20 provides a site at which to fixedly colocate the front-mounted video camera 14 and IR scanner 12 (FIGS. 1 and 2) so that they may be aligned to provide overlapping fields of view having a common area of focus (indicated at F on FIG. 6). The boom 20 is braced against the vehicle 22 by diagonal supports 20d, as shown in FIGS. 1 and 2, or may be of the hydraulic or pneumatic telescoping type, as used on television vans. Video camera 14 and IR scanner 12 thus mounted can be made to pan side-to-side and tilt up and down by remote control means 17 and an operator 28 controlled "joy stick" 17a. Preferably a second video camera 18 is mounted to provide a driver's-eye view of the test area.

A laser device 16 is selectively attached (for example, by cooperative hook-and-pile strips) to video camera 14 and provides a beam to guide the vehicle driver 26, and, as explained later, can also provide an initial point of focus to facilitate the above-mentioned alignment process. As an alternative, a second laser device, 16a, can be similarly attached to the IR scanner 12 to provide a second point of focus. Thus, for example, ne laser may provide a beam to guide the driver 26 and the other to provide a beam for imaging purposes.

Prior to operation, a path of travel of system 10 is defined and the IR scanning equipment 12, 40 is calibrated on a temperature-neutral portion 52 (FIG. 3) of the geological test area. For example, system 10 may traverse a vehicular route, for scanning one or more lanes of the ground or pavement along such route.

Figure 3:
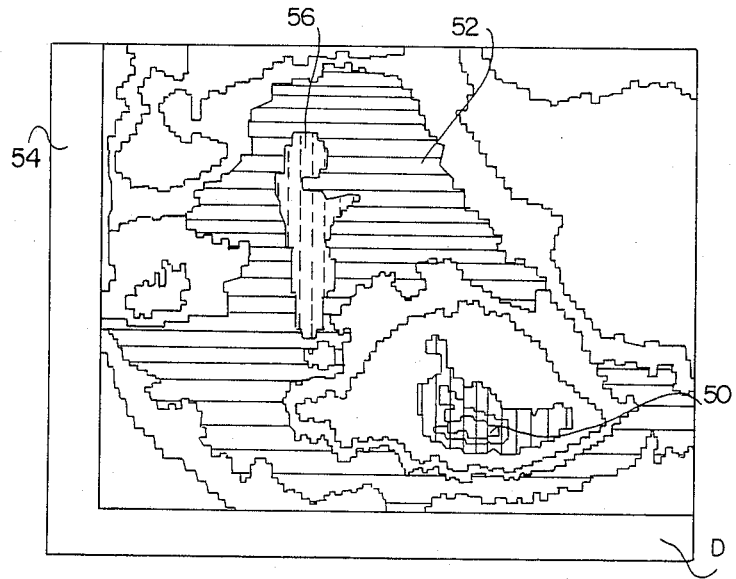
FIG. 3 is a schematic diagram of a simplified infrared image data frame, or thermogram, shaded to illustrate various temperatures detected.
Figure 4:
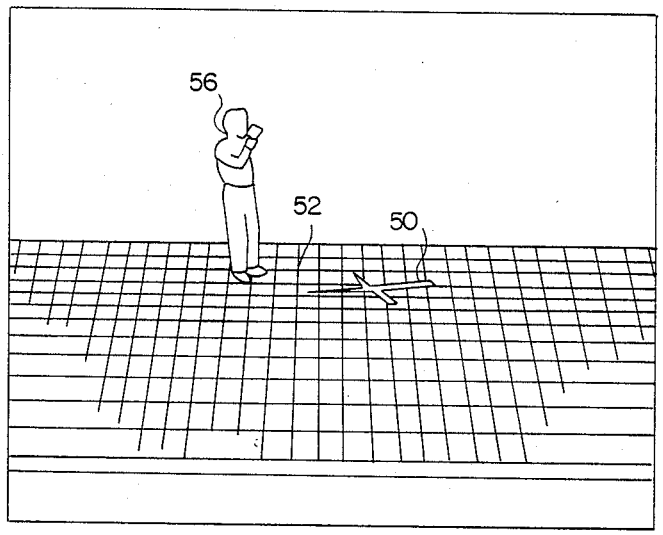
FIG. 4 is a schematic illustration of a single video camera data frame, corresponding to the infrared image of FIG. 3.

The calibration process involves first setting a temperature detection rang of preferably ten isothermic units (roughly translatable into degrees Centigrade) and then narrowing the range to five and then preferably two isothermic units. The range defines a curve having a center line. Preferably all surface temperatures within the test geological area should fall within the calibration curve range. Images detected by the IR scanner 12 will be depicted in various shades of grey on the IR data processor 40 monitor 40a. An electronic colorizer coupled with an analog-to-digital converter 42 converts the various shades of grey to colors. Preferably, a color spectrum or scale is assigned to the temperature range such that problem areas will be displayed as red or some other designated color on the ultimate thermogram (FIG. 3). This color scale may optionally be printed on the IR videodata frame 36a, for example at space 54. The body temperature of a person 56 in the illustrative FIGS. 3 and 4 is off-scale, out of the curve, and depicted as yellow (FIG. 3). For simplicity, FIG. 3 is shown with only three colors. In reality, the IR image would be seen having several colors as well as various shades of some colors. In reality, the image seen in FIG. 6, segment 36a, would also be colored. For simplicity, FIG. 6 is not shown in color.

The beam from laser device 16 indicates a specific point on the test area which is used to precisely focus the fields of view of both the video camera 14 and the IR scanner 12. This laser point also serves as a point of aim for the system driver 26.

Figure 7:
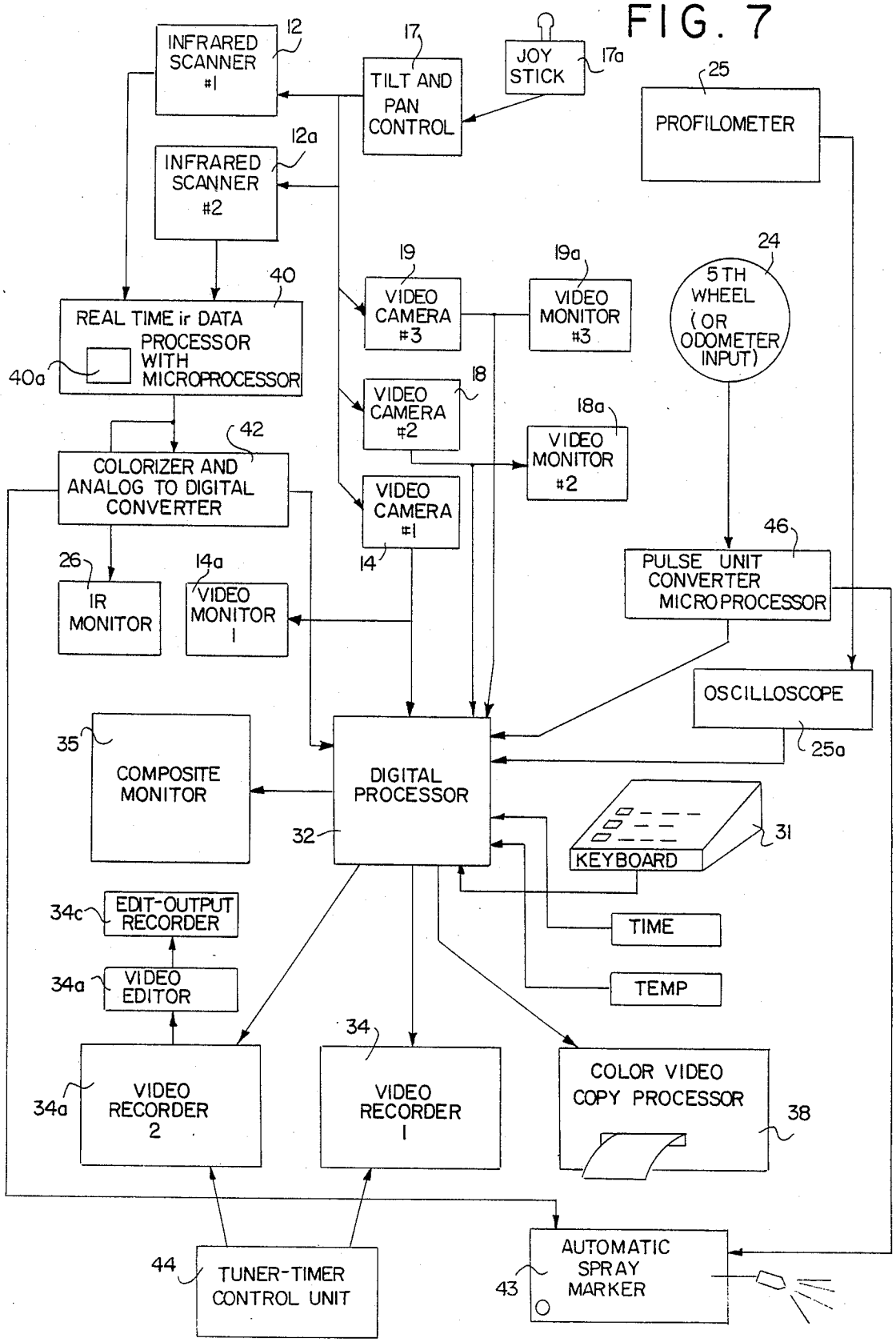
FIG. 7 is a block diagram of system components.

As the driver 26 then guides the vehicle 22 over the geological test area at speeds up to the maximum at which data can be accurately captured, the IR scanner 12, the colocated video camera 14 and the optional driver's-eye video camera 18 each detect and record successive images of their respective fields of view. Video camera 14 records on either color or black and white videotape. The visual image (illustrated in FIG. 4) so registered is simultaneously transmitted to a video processor 32 (hereinafter referred to as a "quad processor"), i.e., a computer which acts as a "switchboard" or central processing unit for input and output of all system data. The quad processor 32 transmits the video image data simultaneously to at least one video tape recorder 34, to a color composite monitor 35 and to a color copy processor 38. Optionally, a video editor unit 34b and an edit-output recorder 34c may be added to the system (FIG. 7). Power for the system 10 components is provided by conventional batteries and a portable generator (not shown).

The video image is visible to the system 10 operator 28 in one 36b of four segments 36a–d of the display screen 36 of the color composite monitor 35, or alternatively on the video camera's respective independent monitor 14a, 18a, 19a (FIG. 7). A pictorial representation of the monitor 36 is shown in FIG. 6. Each of the four segments 36a–d may be enlarged to fill the entire screen 36 for better detail visualization. Likewise, each segment 36a–d can be selectively divided into four sub-segments for enlargement or isolation of data.

Simultaneous with the video 14 recording, the IR scanner 12 detects geological surface temperature levels and variations in the common field of view. The IR image data thus detected are transmitted to a real-time IR data processor 40, of the microprocessor type (FIGS. 5 and 7), where successive images of the IR scans are viewable on an incorporated display screen 40a. Simultaneously, analog form IR image data are converted by a colorizer/analog-to-digital converter 42 to digital form and provided to the quad processor 32 for subsequent selective transmittal to videotape recorder 34, as suitably controlled by a conventional tuner-timer 44. The videotape recorder 34 may be of either the single or multi-channel variety. The IR image data may be simultaneously transferred to another segment 36a of the display screen 36 of the color composite monitor 35 or alternatively viewed on an independent IR monitor 12b.

Visual image data collected by the driver's-eye-view video camera 18 are collected and processed by the system 10 just as that data collected by the front-mounted video camera 14 are captured, with the exception that visual image data are visible in a different segment 36c of the color composite monitor screen 36. As an alternative, one or more additional video cameras 19 (FIG. 7) can also be mounted for increased data collection. For example, a side-view camera 19 can be mounted for system 10 input of data such as house numbers or bridge or highway markers to supplement other location data. The successive images captured by such a side-view camera 19 could be displayed in the fourth segment 36d of the monitor 35 screen 36.

The fifth wheel 24, (attached by braces 25 to the vehicle 22) provides pulse units per distance units travelled by the mobile system 10. In lieu of the fifth wheel 24, a known pulse-typeoodometer unit may be employed, so as to provide to converter 46 a predetermined number of pulses per increment of system 10 travel. A microprocessor 46 converts the above ratio into distance units which are transmitted to the quad processor 32 as location data for selective transmittal in digital form to a video recorder 34, to conventional hard copy and to a separate segment 36d of the color composite monitor 35 display screen 36. If preferred, however, the digital location data may also, or alternatively, be superimposed upon visual or infrared image data in any or all of the other screen segments 36a–d. In like manner, the keyboard operator 28 may choose to superimpose other information such as house number, date, weather or vehicle 22 speed data, onto any area (for example, D in FIGS. 3 and 4) of any of the screen segments 36a–d. As a further alternative to the fifth wheel 24, for aerial scans, allocation data can be geometrically computer generated such as by known LORAN or satellite location technology, for recordation in the system 10 concomitantly with video and IR data images. The operator may choose to display all location data only in an otherwise unoccupied screen 36 segment, for example 36d.

Each full view of the monitor 35 display screen 36 is referred to as a video data frame and each view of a segment 36a–d of the screen 36 is considered a video data segment. Typically, a floppy disk can store a maximum of only about 40 video data frames. The system preferably yields, for example, a normal video frame rate of thirty video data frames per second. Therefore, in order to reduce the volume of data to be subsequently handled, a sampling method may be used to select and store (capture), for example, only every tenth frame.

As system 10 is operating, if the operator 28 detects a problem area on the composite monitor 35 IR data display screen segment 36a (as shown, for example, in FIG. 3), the operator 28 may preset system 10 via the keyboard 31 to automatically mark the problem site 50, via automatic spray paint device 43, preferably with at least semi-permanent paint. This function may be activated either by the pulse-counter or the notation of a red-flagged defect site by the colorizer, or even manually by the system 10 operator 28. This mark will be visible in the video image data frame and on the hard copy thereof, (as shown schematically in FIG. 4).

Optionally, a profilometer 25 may be added to system 10 to provide surface roughness information which may be visualized on an oscilloscope 25a (FIG. 7) as it is transmitted to the quad processor 32 for superpositioning on the successive video data frames.

In addition to the above described mobile field analysis provided b the system 10, a permanent record is also provided for subsequent detailed comparison among the hard copies of simultaneously captured video (FIG. 4), infrared (FIG. 3) and location data 36d frames.

Analysis of the co-referenced data frames first requires location of problem areas (anomaly sites), preferably indicated by the color red on the thermogram, although other color selections and priorities may be utilized. Then the corresponding video (or visual) data frame is studied for surface evidence of subterranean anomalies. Even if no visual clues are in evidence, thermographically red-flagged anomalies 50 (FIGS. 3, 6) can be quickly located due to system location data being preserved simultaneously with the video and IR data. Overall, detection by this method and system 10 results in a very high degree of resolution. This resolution level is possible in part because system 10 location data are automatically incorporated, in part because the IR scanner 12 and video camera 14 fields of view are so precisely in registration with each other and in part because the infrared scanner 12 and processor 40 are carefully calibrated, and possibly recalibrated, to provide an IR data image distinctly illustrating the location as well as the shape of the subsurface anomaly.

Whether a problem site (e.g., 50, FIG. 3) will be cooler or warmer than non-problem areas will depend upon a variety of parameters such as solar radiation, cloud cover, ambient temperatures, wind speed, ground moisture and surface texture. The infrared scanner 12 measures only surface temperatures, which necessarily are affected by the above factors. Additionally, surface temperatures are affected by the presence of voids or other geological anomalies which act as insulators, retarding the flow of energy into or out of the surrounding ground. To illustrate, during daylight hours, the pavement surface absorbs heat from the sun and transfers it to the earth's mass beneath the pavement. The presence of an anomaly slows heat transfer so that the surface above the anomaly becomes warmer as the heat pools there. At night, the process reverses. The pavement yields heat to the relatively cooler night air; however, an anomaly below the surface slows transfer of heat from the earth to the surface. Thus at night, the surface temperature above an anomaly is lower than the temperature of other surface sites. The infrared data image captured by the presently claimed system 10 and methodology illustrates size, shape and relative location of an anomaly beneath the surface of the subject geological area.

Operation of system 10 involves the following processes and advantages: quad processing of precisely registered IR scanner and video camera fields of view plus simultaneously incorporated, computer converted and recorded video frame location data permit very fast, accurate, labor efficient detection of subterranean anomalies. Pavement markings and slow image-matching analysis are thus unnecessary. Incorporation of a color composite monitor 35 permits system operation observation and on-site anomaly detection with optional automatic anomaly site marking (43). Individual screen segments 36a–d of the composite monitor 35 can be enlarged to better view details. Video data frames (such as in FIGS. 3 and 4) can be individually selectively stored on hard copy (as photographs) and a reference data base of defect thermographic signatures can be developed by which to increase recognizability of defects, as well as to permit comparison with subsequent thermograms (IR video data frames) of a particular area in order to detect progressive damage. System 10 permits operator 28 entry of other data, such as date, weather, etc., either audibly or by keyboard 31, into any of the segments (video, IR, or other) of the video data frame (for example, in space D); any segment or whole frame being selectively storable. A multiplicity of IR scanners or video cameras may be used simultaneously, as many total as there are video data frame segments (even more than four) on the composite monitor. Thus a very large geological area can be evaluated with only one simultaneous "viewing" by the IR scanners and their colocated video cameras. System 10 may be mounted on any of several selectively mobile means, such as an automobile, a helicopter or a bucket truck. Location data collected by any of several alternative methods can be superimposed on all (36a–d or any of the video or IR data frames, as previously described. In this system 10, only the vehicle driver 26 and probably one other human operator 28 are necessary; no ground crews are required. The present system 10 is safe in that it does not require penetration of the geological area surface, either by personnel or mechanical means, and does not require hazardous irradiation. No danger is encountered other than that required in operating mobile system 10 over or near the test area.

EXAMPLE OF SYSTEM OPERATION: DETECTION OF DAMAGED SEWER LINES

The following example is provided to illustrate typical operation of the present system.

Figure 5:
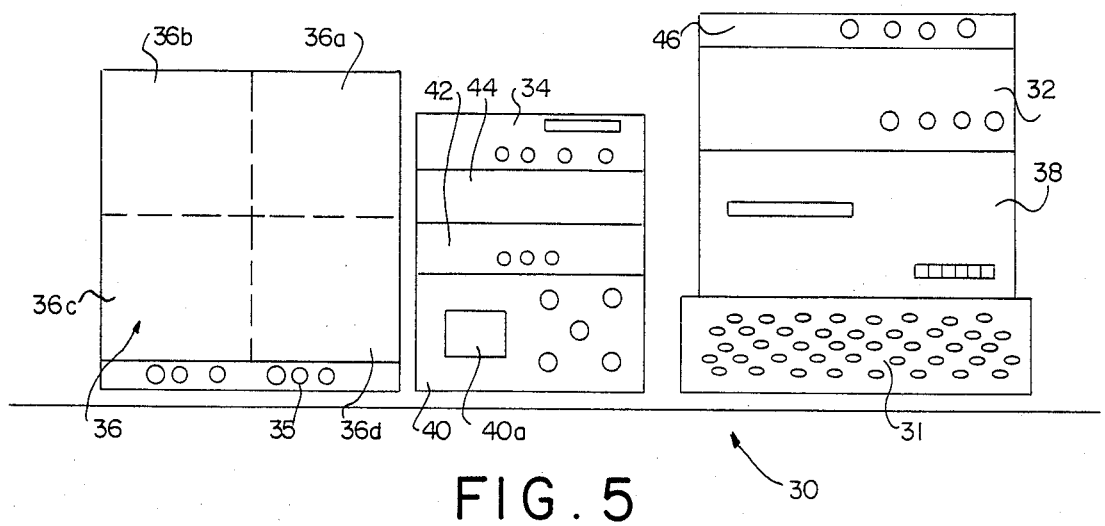
FIG. 5 is a simplified physical layout of electronic components of the image and location data processing and preservation means of the present invention.

System 10 is arranged as illustrated in FIGS. 1, 5 and 7. After the driver proceeds to the test location, an alley traversing over a known sewer line, the system is calibrated and the IR scanner(s) and the video cameras are focused as previously described. Additionally, calibrated visual marking indicia are placed on the pavement in the initial field of view. This marker is visible in the video data frame of that field of view and serves as an additional location reference marker. Appropriate IR scanner and video camera lenses and angles are employed to enable the system data frames to incorporate the entire width of the alley in one "pass", or drive-over. As the driver carefully guides the system vehicle along the alley, the system operator verifies the previously described system operation by watching the color composite monitor, the IR data processor screen and any other monitors selectively added to the system. At the same time, the operator incorporates additional information, such as cross street names, ground surface moisture and precise pavement type.

Assuming that the system has bee color-calibrated as previously described, when the operator sees a red area within the IR data segment of the color composite monitor screen, the red is recognized as signalling the presence of a subsurface anomaly, such as a void, which may lead to, or already have caused, a collapsed sewer wall, collapsed surface pavement, or the separation of a lateral sewer line from the main sewer.

Upon recognizing a problem site, several options are available to the system operator. For example, the operator may immediately compare the IR image with the corresponding visual image on the monitor. If an adequate visual reference point exists, he may enter a note to that effect on the visual and/or IR data frames; e.g., "defect exists four feet directly north of the light pole behind house address 4567 White Street." Preferably also, a color video copy processor is activated to produce a color print of one or more video frames including the defect area. The system can thus continue along the alley essentially uninterrupted. However, whether or not adequate visual reference markers are present, the problem site can be physically marked on the pavement, either manually or by the automatic spray paint device previously described. Verification of accurate marking is possible by viewing the IR and video image data segments.

The above procedure is repeated along the entire test distance of the alley. The operator instructs the system as to which data frames on the video tape recording to select and store in photograph form. Additionally, selected data frames are later transferred to a floppy disk for subsequent use and storage. The stored IR and video data frames are then permanently available for comparative analysis. On the basis of the analysis, repair crews are able to easily locate the sewer defect, rather than having to physically crawl into the sewer or dig up long stretches of alley while searching for the problem. Thus a possible sewer cave-in is prevented and expensive emergency or overtime measures are avoided.

In view of the foregoing, it will be seen that the several objects of the invention are achieved and other advantages are attained.

Although the foregoing includes a description of the best mode contemplated for carrying out the invention, various modification are contemplated.

As various modifications could be made in the constructions herein described and illustrated without departing from the scope of the invention, it is intended that all matter contained in the foregoing description or shown in the accompanying drawings shall be interpreted as illustrative rather than limiting.

What is claimed is:

1. A selectively mobile system for infrared thermographic and visual scanning and comparative analysis for evaluating geological areas for subterranean anomalies comprising:
   an infrared scanner for scanning a geological area;
   a video camera for scanning such a geological area;
   mobile carrying means upon which said infrared scanner and said video camera are fixable for movement relative to such geological area while scanning;
   location indicator means; and
   image and location data processing and preservation means;
   said infrared scanner and said video camera being alignable to provide overlapping fields of view having a common area of focus;
   said location indicator means comprising means for providing location data uniquely representative of locations of such geological area within the common area of focus;
   said image and location data processing and preservation means comprising means for continuously capturing infrared and video images add location data within the common area of focus; for superposing the infrared image, video image and location data on single composite video frames, for successively video recording such composite video data frames for further use; and for simultaneously selectively monitoring the infrared and video images and location data for visual verification of such video data frames.

2. A system as in claim 1 and further comprising a profilometer for provision of geological area surface roughness information for integration with other data collected by said system.

3. A system as in claim 1 and further comprising a video monitor for viewing composite data frames provided by the video processing means.

4. A system as in claim 1 and further comprising a video monitor for independent viewing of video images provided by the video camera.

5. A system as in claim 1 and further comprising a monitor for independently viewing the infrared images provided by the infrared scanner.

6. A system as in claim 1 and further comprising keyboard means for selective operator provision of information relevant to said scanning for superposition by the data processing and preservation means on the video frame segments.

7. A system as in claim 1 and further comprising color video copy processor means for provision of hard copy of such video data frame segments.

8. A system as in claim 1 and further comprising laser means by which to provide a common point of focus for said aligned infrared scanner and video camera overlapping fields of view and further by which to guide a driver of said selectively mobile system.

9. A system as in claim 1, wherein said location indicator means comprises distance input means for provision of distance signals for further processing by said data processing means.

10. A system as in claim 9, wherein said distance input means comprises odometer means responsive to movement of said mobile carrying means for providing pulse-form distance signals and distance processor means for converting such distance signals to digital form.

11. A system as in claim 1, wherein said mobile carrying means comprises a selectively mobile vehicle having mounting means upon which said infrared scanner and said video camera are adjustably affixed.

12. A system as in claim 11 wherein said mounting means comprises telescoping boom means upon which said infrared scanner and said video camera are movably secured for vertical and horizontal positioning.

13. A system as in claim 12 and further comprising remote control means for remotely controlling vertical and horizontal positioning of said video camera and said infrared scanner.

14. A system according to claim 1 wherein the data processing and preservation comprises at least one video recorder; and video processing means for processing the infrared and video images and location data to provide a composite video output of the superposed infrared image, video image and location data to the video recorder for recording.

15. A system according to claim 14 and further comprising means for causing the infrared images to have a color spectrum indicative of preselected temperatures for video recorder capture of such colors.

16. A system as in claim 14 and further comprising a videotape recorder of the multi-channel type for simultaneous recording on separate channels of information relevant to such geological scanning.

17. A system as in claim 14 and further comprising a video editor by which such video recorded infrared and visual data may be edited; and an edit-output recorder for storage of such edited video recordings.

18. A system as in claim 14 and further comprising videotape recording means for audio recording of information simultaneously with the videotape recording.

19. A system as in claim 14 and further comprising automated marking means; whereby to impose indicia upon selected geological sites during the course of the scan of such sites.

20. A system according to claim 14 wherein the video processing means provides successive video frames for storage by a video recorder.

21. A system according to claim 20 wherein each video frame includes a plurality of discrete segments; one of such segments carrying a captured infrared image of such scanned geological area and another of the segments carrying a captured video image of such scanned geological area.

22. A system according to claim 21 wherein each video frame includes a further segment carrying the location data.

23. A system according to claim 22 wherein each video frame includes at least one further segment for carrying additional information relative to said scanning.

24. A system as in claim 23 comprising at least one further infrared scanner, for scanning adjacent fields of view of such geological area; one of the video frame segments carrying an infrared image captured by said further infrared scanner.

25. A system according to claim 23 wherein each video frame includes a total of four such segments.

26. A system according to claim 25 and comprising at least one further video camera for visual scanning while evaluating such geographical area, one of the video frame segments carrying a video image captured by said further video camera.

27. A system as in claim 26 further comprising one of said cameras being so located and focused as to reveal a field of view analogous to the view seen by a driver of said selectively mobile system.

28. A system as in claim 9 wherein one of said cameras is so located and focused as to reveal a field of view differing from that of said aligned video camera and infrared scanner, for additional detection of information relevant to such geological scanning.

29. A selectively mobile system for infrared thermographic and visual scanning and comparative analysis for evaluating geological areas comprising:
   an infrared scanner for scanning a selected area;
   a video camera for scanning such area;
   mobile carrying means upon which said infrared scanner and said video camera are fixable for movement relative to such area while scanning;
   location means; and
   image and location data processing and preservation means for continuously capturing infrared and video images and location data, for superposing the infrared image, video image and location data on single composite video frames, and for successively video recording such composite video data frames for further use.

30. A system according to claim 29 wherein said data processing and preservation means includes means for simultaneously selectively monitoring the infrared and video images and location data for visual verification of such video data frames.

31. A system according to claim 29 wherein said infrared scanner and said video camera are alignable to provide overlapping fields of vie having a common area of focus.

32. A system according to claim 29 wherein the data processing and preservation comprises at least one video recorder; and video processing means for processing the infrared and video images and location data to provide a composite video output of the superposed infrared image, video image and location data to the video recorder for recording.

33. A system according to claim 99 wherein each video frame includes a plurality of discrete segments; one of such segments carrying a captured infrared image of such scanned geological area an another of the segments carrying a captured video image of such scanned geological area.

34. A system according to claim 29 wherein each video frame includes a further segment carrying the location data.

35. A system according to claim 29 wherein each video frame includes at least one further segment for carrying additional information relative to said scanning.

36. A system according to claim 29 wherein each video frame includes a total of four such segments.

37. A system according to claim 29 and further comprising operator input means for selectively providing information relevant to such scanning for superposition by the data processing and preservation means on the video frame segments.

38. A selectively mobile system for infrared thermographic and visual scanning and comparative analysis for evaluating geological areas for subterranean anomalies comprising at least one infrared scanner, at least one video camera, a location detecting means, image and location data processing means, image and location data preservation means and a vehicle for carrying said infrared scanner, video camera, location means and processing and preservation means;
   said infrared scanner and said video camera being colocated and affixed by carrying means to said vehicle and alignable to provide overlapping fields of view having a common area of focus of selectively scanned portions of a geological area as said vehicle is moved relative thereto;
   said video camera providing video data output representing successive visual images of the selectively scanned area portions;
   said infrared scanner providing infrared data output representing variations in temperature of the selectively scanned area portions;
   said location detection means being responsive to movement of said vehicle for providing location data representing at least he relative position of said vehicle in said geological area, said location data identifying two selectively scanned area portions;
   said image and location data processing means comprising:
   (a) means for colorizing the infrared data output to provide colored infrared data wherein colors represent differences between anamolous and nonanamolous regions of the selectively scanned area portions;
   (b) means for converting the location data to visually recordable form;
   (c) means for permitting operator provision of further visually recordable information data relevant to the selectively scanned area portions;
   (d) composite video processing means for superposing the colored infrared data, visual data, visually recordable location data, and information data to provide composite video data wherein video frames each have segments corresponding to such forms of data; and
   (e) video monitor means for operator viewing of the composite video data;
   said image and location data preservation means comprising:
   (f) at least one video recorder for sequentially recording video frames of said composite video data; and
   (g) color videocopy processor means selectively operator actuated for providing hard copy of selected video frames.

39. A method of infrared thermographic and video scanning and comparative analysis for evaluating geological areas for subterranean anomalies, comprising
   colocating an infrared scanner and a video camera by affixing them on a mobile carrying means;
   aligning the infrared scanner and video camera to provide overlapping fields of view having a common area of focus;
   capturing successive infrared images of the common area of focus to provide infrared image data representative thereof; while concommitantly
   capturing successive video images of the common area of focus to provide video image data representative thereof; and while also concommitantly
   capturing successive location data uniquely representative of geologic locations within the common area of focus;
   superposing the infrared image, video image and location data on a composite video data frame; and
   successively video recording such video data frames for further use.

40. The method of analysis as in claim 39, further comprising simultaneously selectively monitoring the captured infrared and video images and location data for visual verification of such video data frames.

41. The scanning method as in claim 39 further comprising aligning more than one infrared scanner to have overlapping fields of view and a common area of focus with said video camera, for simultaneous scanning adjacent fields of view of such geological area.

42. The method of analysis in claim 39; and further comprising editing such video recording of such video data frames for further use.

43. The scanning method as in claim 39; and further comprising audibly inserting information onto such videotape recording.

44. The method of analysis as in claim 39 further comprising automatically marking on the surface of such scanned geological areas subterranean anomaly locations as such locations are identified within such captured infrared image data for facilitating later identification of such anomaly locations.

45. The scanning method as in claim 39; and further comprising:
 measuring profilometrically the roughness of a surface being scanned; and
 transferring such roughness information to said data processing means for recording on said video frames.

46. The scanning method of claim 39, further comprising:
 using a laser means to provide a single point of light serving as a common point of focus in each of the overlapping fields of view; and
 aligning the infrared scanner and said video camera by alignment thereof with said single point of light.

47. The method of analysis of claim 39, and further comprising selectively providing hard copies of successive infrared, video and location data frames, for storage and analysis.

48. The scanning method as in claim 39; and further comprising using at least one additional video camera, being so located and focused as to reveal a field of view differing from that of said aligned video camera and infrared scanner, and superposing the images produced by such additional video camera on successive composite video data frames.

49. The scanning method as in claim 48; wherein said at least one additional video camera is so located and focused as to reveal a field of view analogous to the view seen by an operator of said mobile carrying means.

\* \* \* \* \*

UNITED STATES PATENT AND TRADEMARK OFFICE
CERTIFICATE OF CORRECTION

PATENT NO. : 4,910,593
DATED      : March 20, 1990
INVENTOR(S): Gary J. Weil

It is certified that error appears in the above-identified patent and that said Letters Patent is hereby corrected as shown below:

Col. 9, li. 23, "add" should be --and--;

Col. 11, li. 1, "9" should be --26--;

li. 29, "vie" should be --view--;

li. 38, "99" should be --29--;

li. 41, "an" should be --and--.

Signed and Sealed this

Twenty-sixth Day of March, 1991

Attest:

HARRY F. MANBECK, JR.

*Attesting Officer*     *Commissioner of Patents and Trademarks*